Patented June 8, 1937

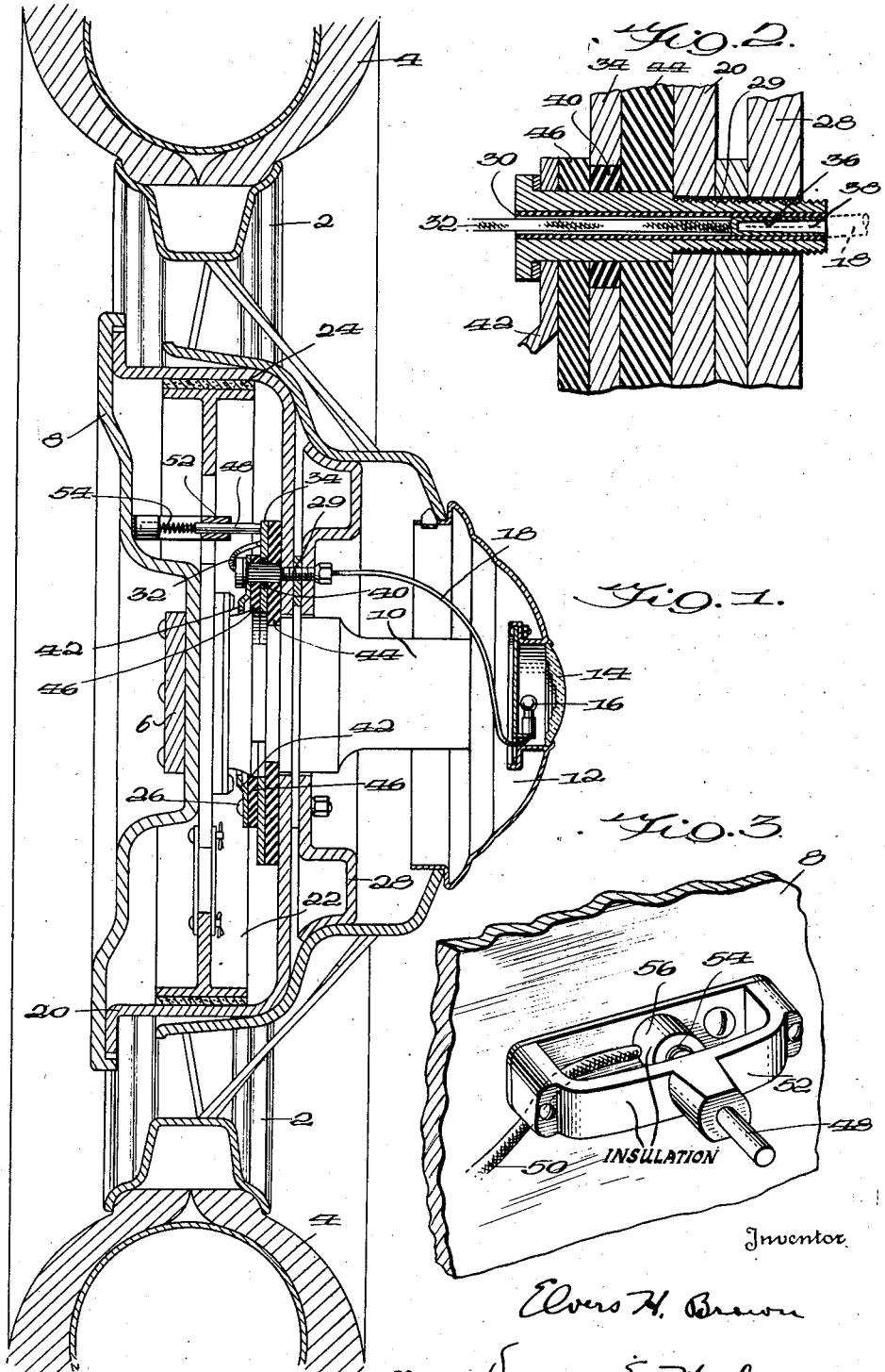

2,083,514

UNITED STATES PATENT OFFICE 2,083,514

WHEEL HUB LIGHT

Elvers H. Brown, Gauley Bridge, W. Va., assignor to The Auto Hublight Company, Charlottesville, Va., a copartnership consisting of Elvers H. Brown, Syria, Va., and Harry D. Faulconer, Charlottesville, Va.

Application June 26, 1935, Serial No. 28,552

2 Claims. (Cl. 240—8.12)

My invention relates to an improvement in wheel hub lights.

It has been found to be very desirable to light the hub of a vehicle wheel, for if a light is provided on the hub of a vehicle wheel, the driver of a car coming in the opposite direction to a car provided with lights on the wheel hubs can readily see the lights and immediately know the width of the approaching car.

An object of my invention is to provide a light in the hub of a vehicle wheel, the electrical connections to supply the electricity to the light being entirely housed within the wheel.

A further object is to provide electrical contact means which allow the rotation of the wheel relative to an axle housing.

A still further object of my invention is to provide means for securing an electrical contact ring to a wheel and insulating that ring, so that it will not be in contact with any metal part of the wheel, axle or axle housing.

In the accompanying drawing:

Fig. 1 is a cross-section of a modern automobile wheel, showing a light in the hub and a contact means between the wheel and axle-housing;

Fig. 2 is an enlarged fragmentary section showing a bolt adapted to hold the contact ring on the wheel; and Fig. 3 is an enlarged perspective view of the contact brush to be mounted on the axle-housing.

The wheel 2 is conventional in its construction and is adapted to hold a pneumatic tire 4. The wheel 2 is mounted on a so-called knee-action supporting arm 6 which is affixed to the housing 8. A stub axle is provided and fits within the hub 10 of the wheel 2.

In the hub cap 12, I provide a suitable translucent lens 14 behind which is mounted an electric bulb 16, which bulb is of the conventional "single contact" type, one point of contact being with a "ground" connection, that is any part of the frame of the automobile, and the other contact being in the center of the bulb stem contacting the wire 18.

The wheel 2 is supported in the conventional manner on the brake-drum 20, which brake-drum is secured to the hub 10 and is positioned within the axle housing 8, and is in registry with the customary brake-shoes 22, having conventional brake-bands 24.

In mounting the wheel 2 over the brake-drum 20, all of the bolts 26 (with the exception of one which will be more fully described hereinafter) are of ordinary construction, and are adapted to be passed through the brake-drum and an inner flange 28 of the wheel 2.

The construction of one bolt, the bolt 29, for securing the flange 28 to the brake-drum 20, is shown in the enlarged cross-section of Fig. 2. This bolt is of ordinary metal construction and has a channel drilled therethrough, in which channel I place an insulating sheathing 30. Through this insulated channel I pass the wire 32 which is adapted to be electrically connected with the electric contact ring 34. An end of the wire 32 within the insulated channel in the bolt 29 is provided with an inwardly tapering contact surface 36 into which a conical contact point 38, secured to the end of the wire 18 may be inserted.

The electrical contact ring 34 is provided with insulating washers 40, which washers are pressed into position in the ring 34, through which the bolts 26 and 29 pass when the wheel is secured on the brake-drum 20. These insulated washers 40 serve to insulate the contact ring 34 from the bolts 26 and 29, which, of necessity, would make an electrical contact with the metallic parts of the brake-drum 20 and the wheel flange 28, if the washers 40 were not utilized.

The contact ring 34 is insulated on its sides from the brake-drum 20 and the metallic oil catching plate 42, by the insulating rings 44 and 46.

With this electrical contact ring 34 properly positioned within the brake-drum 20, as shown particularly in Fig. 1, it is in position to contact the contact brush 48, which brush is of carbon or other suitable contacting material, and is adapted to be secured to the axle housing 8 and electrically connected with the wire 50.

The contact brush 48, shown more particularly in Fig. 3, is slidably held within the insulated block 52, and is spring-pressed by the spring 54, which spring is held within the insulated cup 56, and is electrically connected with the wire 50. Since this contact brush assembly is mounted on the axle housing 8, it does not rotate with the wheel 2, and consequently the wire 50 may be connected in any suitable manner to a source of electric current.

The electric current to illuminate the bulb 16 will flow as follows: From the source of supply through the wire 50, the spring 54, the contact brush 48, the electrical contact ring 34, the wire 32 passing through the insulated channel 30 within the bolt 29, the tapering contact 36, the conical contact 38 secured to the wire 18, the wire 18 to the bulb 16, through the filaments thereof, and then through the "ground" by its direct connection with the hub-cap 12, the wheel 2 and the hub 10 to the supporting arm 6, and thus through the frame of the vehicle to the source of electrical supply.

With this construction, the wheel will be allowed to properly rotate on its axle while the contact brush 48 is always in electrical contact with the electrical contact ring 34, which ring is properly insulated by the insulating washers 40 and rings 44 and 46 from the bolts 26 and 29 and the brake-drum 20.

It will be understood that slight modifications may be made in the exact construction and assembly of these several parts without departing from the spirit of the invention, the essential features being the properly insulated bolt 29 through which one electrical conductor may pass, the electrical conductor ring 34, and the contact brush 48, all of which must be insulated from the "ground", or the frame of the vehicle.

I claim:

1. An automobile hub cap light including a bulb "grounded" to said hub cap, a brake drum secured to the wheel on which said hub cap is mounted, a brake housing, a hollow bolt securing said brake drum to said wheel, an electrical conductor connected to said bulb and passing through said hollow bolt, a contact ring secured within said brake drum, insulated therefrom, and electrically connected with said conductor, and a contact brush secured within the brake drum housing in position to engage said contact ring, said contact brush being insulated from said brake housing and electrically connected with a source of supply of electricity.

2. An automobile hub cap light including a bulb "grounded" to said hub cap, a brake drum secured to the wheel on which said hub cap is mounted, a brake housing, a hollow bolt securing said brake drum to said wheel, an electrical conductor connected to said bulb and passing through said hollow bolt, a contact ring secured within said brake drum, insulated therefrom, and electrically connected with said conductor, a spring-pressed contact brush secured within the brake drum housing in position to engage said contact ring, a support for said contact brush, and means electrically connecting said brush with a source of supply of electricity, said support comprising a base secured to the brake housing, a substantially U-shaped block of insulating material through which said brush yieldably passes, and an insulated cup in which said spring-pressed brush is secured.

ELVERS H. BROWN.